T. M. GARDNER.
METHOD FOR DETERMINING THE CHARACTERISTICS OF VAPOR.
APPLICATION FILED OCT. 13, 1906. RENEWED FEB. 15, 1912.

1,042,782. Patented Oct. 29, 1912.
5 SHEETS—SHEET 1.

Witnesses
Wm C Dashiell
W B Deane

Inventor
Thomas M. Gardner
by
James Hamilton Attorney

T. M. GARDNER.
METHOD FOR DETERMINING THE CHARACTERISTICS OF VAPOR.
APPLICATION FILED OCT. 13, 1906. RENEWED FEB. 15, 1912.

1,042,782.

Patented Oct. 29, 1912.

5 SHEETS—SHEET 2.

T. M. GARDNER.
METHOD FOR DETERMINING THE CHARACTERISTICS OF VAPOR.
APPLICATION FILED OCT. 13, 1906. RENEWED FEB. 15, 1912.
1,042,782.
Patented Oct. 29, 1912.
5 SHEETS—SHEET 3.
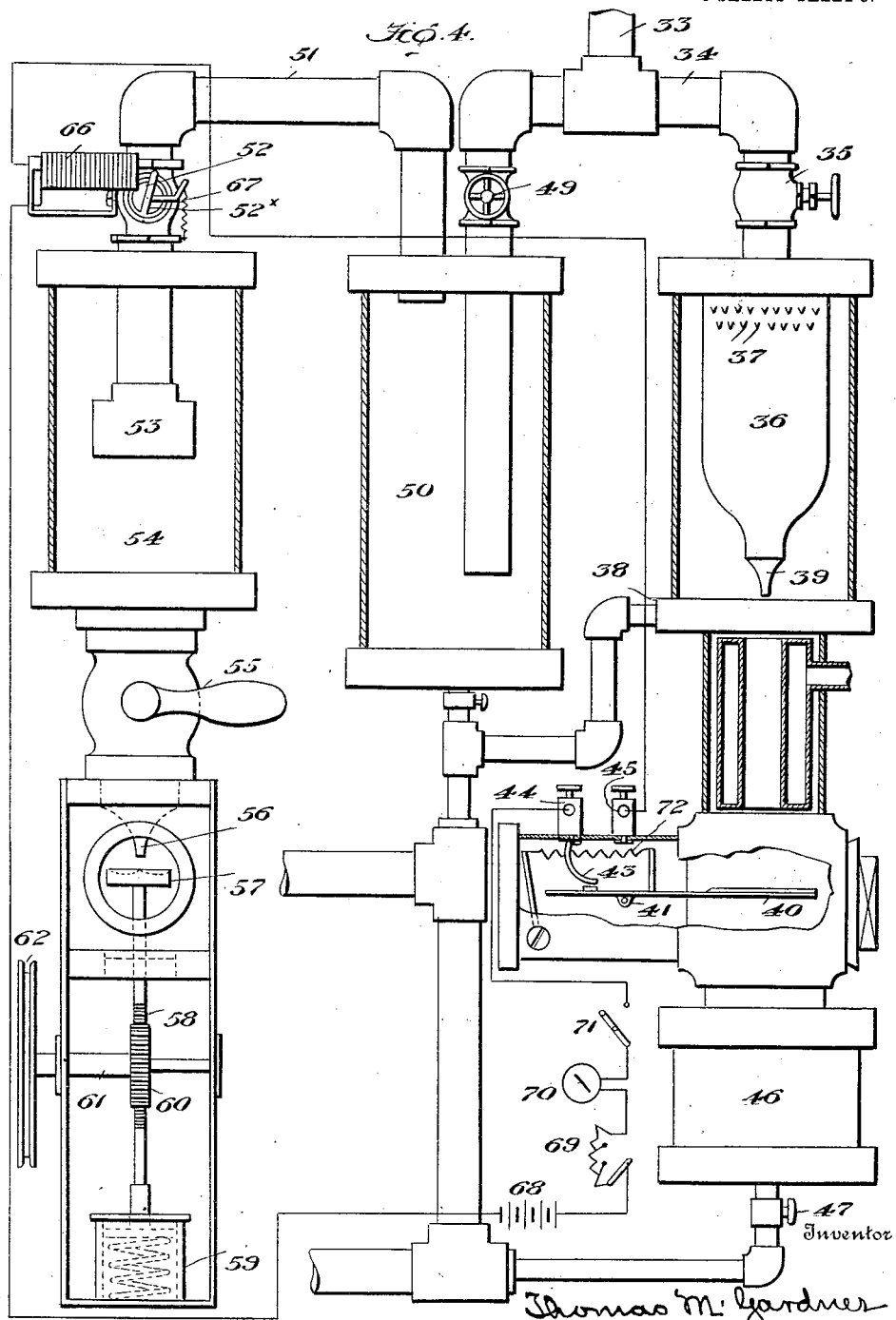

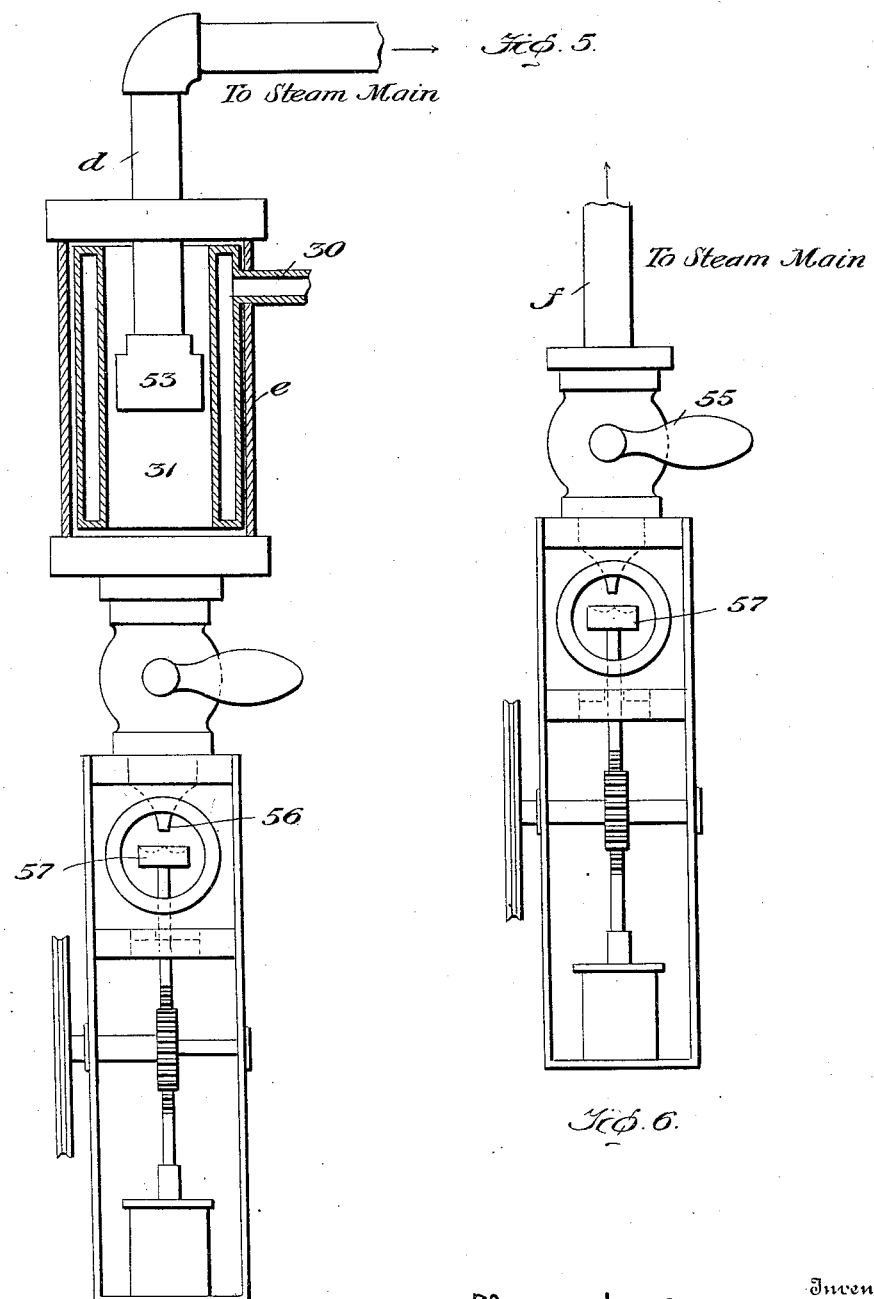

T. M. GARDNER.
METHOD FOR DETERMINING THE CHARACTERISTICS OF VAPOR.
APPLICATION FILED OCT. 13, 1906. RENEWED FEB. 15, 1912.
1,042,782.
Patented Oct. 29, 1912.
5 SHEETS—SHEET 5.
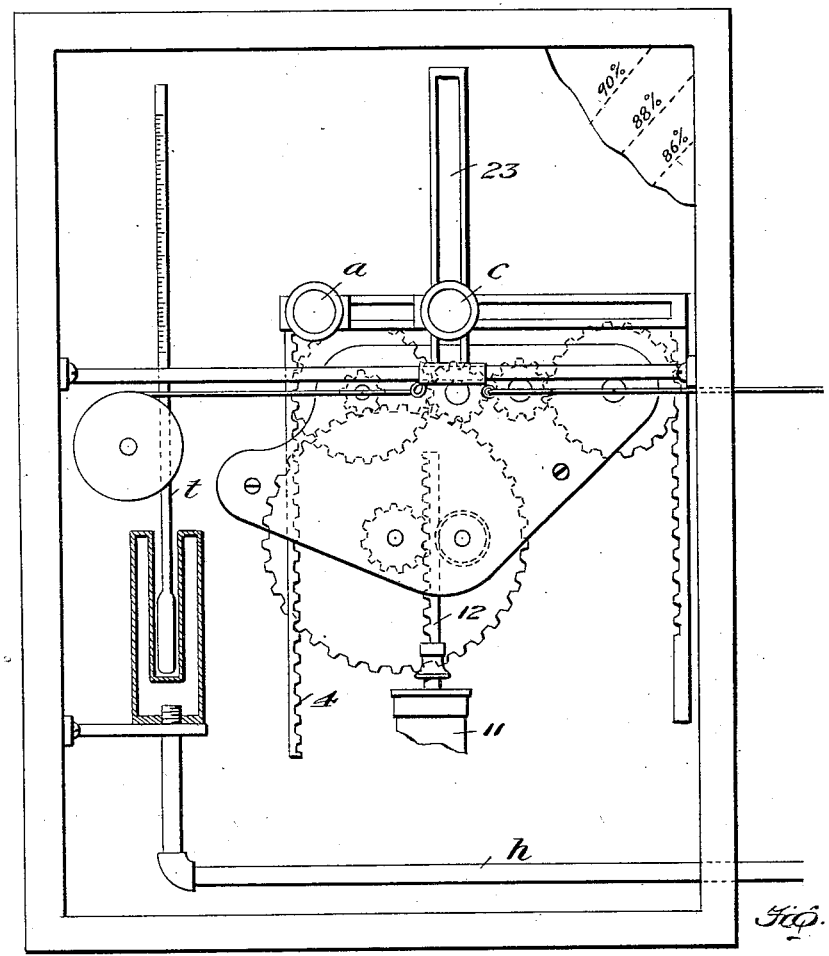
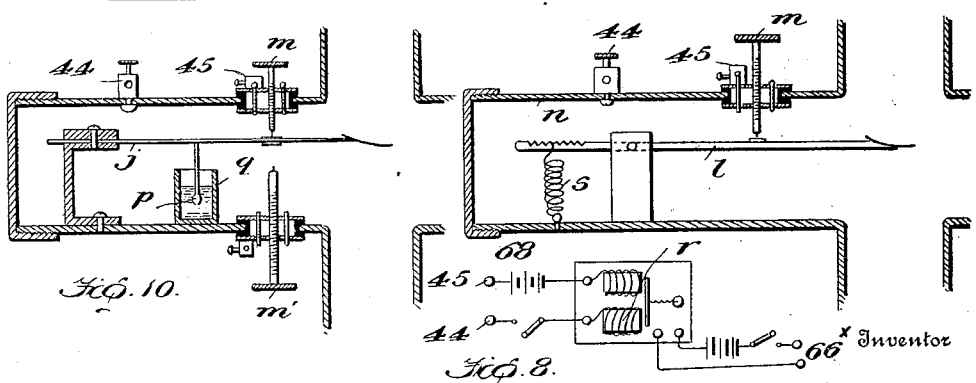

UNITED STATES PATENT OFFICE.

THOMAS M. GARDNER, OF URBANA, ILLINOIS.

METHOD FOR DETERMINING THE CHARACTERISTICS OF VAPOR.

1,042,782.  Specification of Letters Patent.  Patented Oct. 29, 1912.

Application filed October 13, 1906, Serial No. 338,731. Renewed February 15, 1912. Serial No. 677,862.

*To all whom it may concern:*

Be it known that I, THOMAS M. GARDNER, a citizen of the United States, residing at Urbana, in the county of Champaign and State of Illinois, have invented certain new and useful Improvements in Methods for Determining the Characteristics of Vapor, of which the following is a specification, reference being had to the accompanying drawings.

My invention relates to improvements in methods for determining vapor characteristics, such as the dryness fraction of the vapor, its superheat, the number of thermal units contained in a unit weight of the vapor.

The object of my invention is to provide a method which will be rapid, accurate and capable of giving the state of the vapor continuously through a wide range of conditions as to pressure, temperature and degrees of dryness or "quality."

In all the methods heretofore used, so far as known to me, for determining the "quality" or dryness fraction of the vapor, the results obtained have formed merely the basis for mathematical computations through which the final result, the dryness fraction, has been determined. That is, the methods have involved the use of mathematical computations. In my new method all such mathematical computations are avoided.

Speaking generally and avoiding the mention of details by which my new method is carried out, the vapor is made to impinge in the form of a jet upon one element of a measuring device; and the force of the impact is measured. The amount of vapor emitted or discharged in the form of a jet may be controlled by the amount of entrained liquid in the vapor. The amount of displacement of the device which measures the force of the impact will also give the relative number of thermal units per unit weight of the vapor.

Hereinafter I shall proceed to describe several forms of apparatus by which my new method may be carried out.

Figure 1:
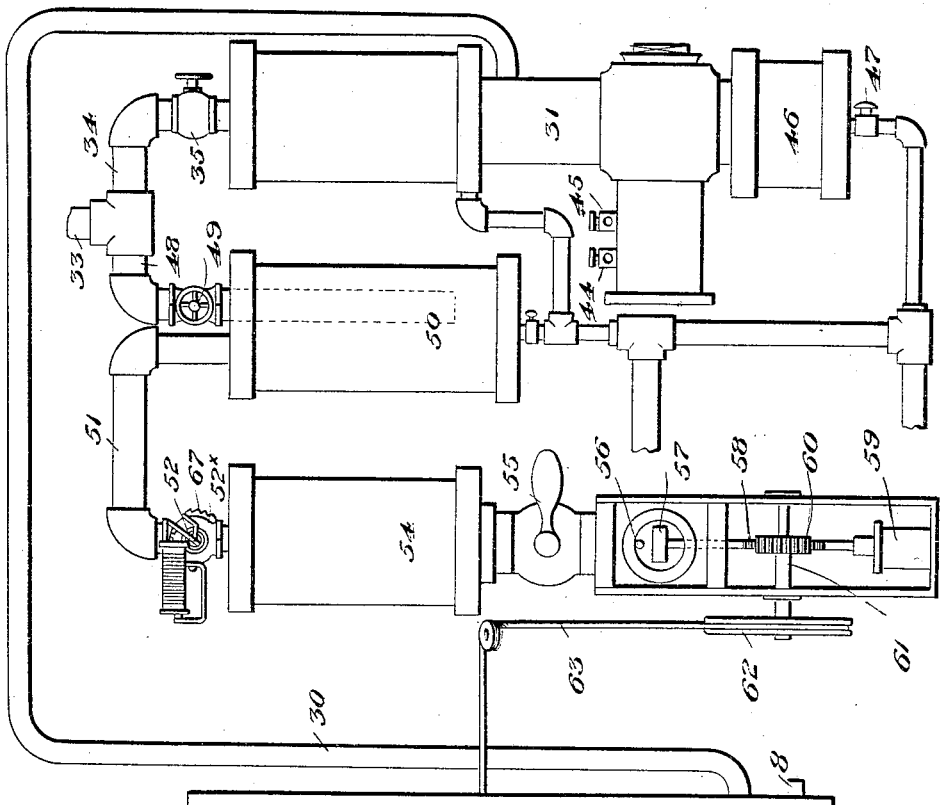
Figure 1:
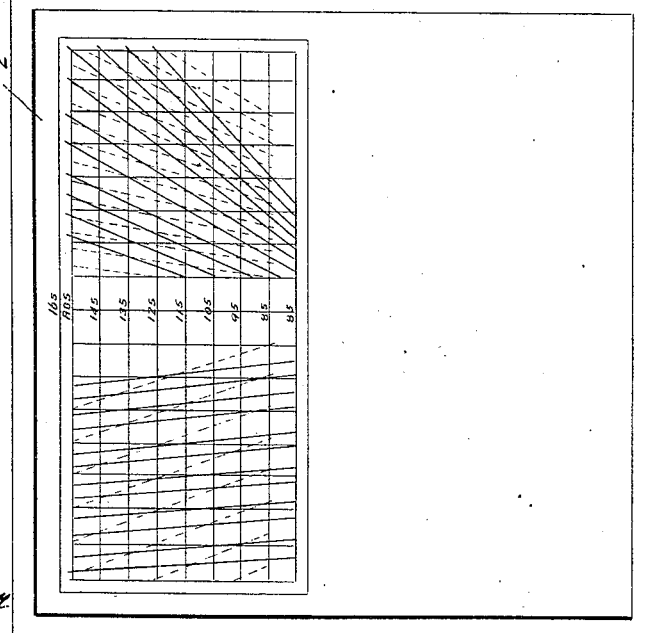
Figure 2:
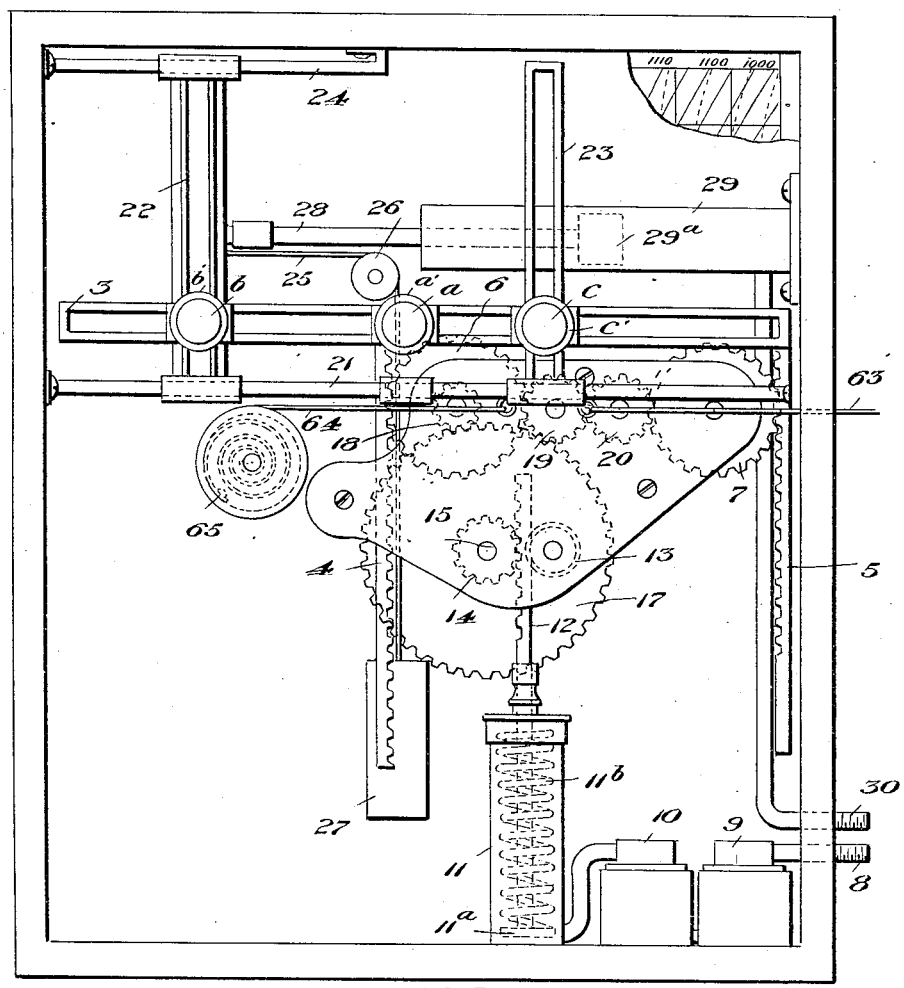
Figure 3:
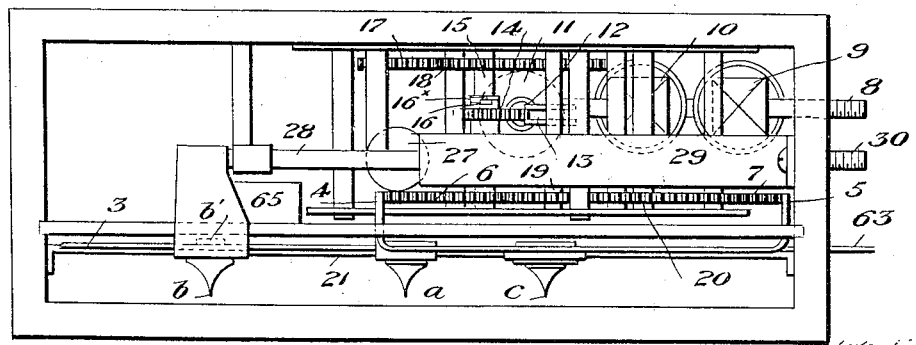

In the drawings illustrating the principle of my invention and the best mode now known to me of applying that principle, Figure 1 is an elevation of the parts assembled, the view being general and diagrammatic in its nature; Fig. 2 is an elevation of the register; Fig. 3 is a plan of what is shown in Fig. 2; Fig. 4 is a diagrammatic view in elevation of certain parts pertaining to the separation of the entrained liquid from the vapor and the positioning of the pointer of the quality register; Figs. 5, 6 and 7 illustrate modifications; and Figs. 8, 9 and 10 illustrate details hereinafter referred to.

The face of the register is a glass plate or dial 2 upon which are drawn curves (Fig. 1) indicating graphically the relation between the pressure in pounds absolute per square inch, the degree of superheat or the dryness-fraction (depending upon whether the vapor is superheated or "wet"), and the number of thermal units per pound of the vapor. The dial also shows the temperature of the vapor. Obviously, other curves may be drawn or the units selected may be different from those shown. Behind the plate or dial 2 move three pointers $a$, $b$ and $c$, the first of which indicates the pressure of the vapor, the second of which shows the temperature and the degree of superheat (if the vapor be superheated) and the number of heat units per pound of the vapor at the temperature and degree of superheat indicated; and the third of which registers the dryness-fraction or quality of the vapor and the number of heat units per pound of the vapor of the quality indicated. The pointer $a$ has movement in a vertical direction only, while the other two pointers ($b$ and $c$) are given a combined vertical and horizontal movement. The three pointers are carried by a transverse slotted bar 3 the vertical movement of which displaces the pointers vertically and to a like degree. To move the slotted bar 3 in a vertical direction, the following mechanism is provided: From the ends of the bar 3 depend two racks 4, 5 the teeth of which mesh with the teeth of the pinions 6 and 7, respectively; and since the pinions 6, 7 are caused to rotate in opposite directions, the intermeshing racks are made to move in the same direction to raise and lower the slotted bar 3. The pinions 6, 7 are caused to rotate by the pressure of the vapor transmitted through the following mechanism: The vapor is led under its own pressure through the pipe 8 into the vessel 9 containing its liquid. The vessel 9 communicates with the oil-reservoir 10 and the latter in turn communicates with a cylinder 11 within which works a piston 11ª against the tension of a spring 11ᵇ the rod 12 of which is formed with a rack and passes between the flanges projecting from the rim of the guide-wheel 13. The rack of the piston-rod 12 meshes with a pinion 14 loose upon its shaft 15 upon which is a collar 16 which is secured thereon by a set-screw 16ˣ by loosening which the collar 16 may be adjusted on its shaft 15. Both the pinion 14 and the collar 16 are formed with shoulders which are adapted and designed to engage each other (Fig. 3), whereby the rotary motion of the pinion 14 is communicated to the collar 16 and thence to the shaft 15, fast upon which is a gear 17 in mesh with a pinion 18 upon the same shaft with which is the pinion 6 in mesh with the rack 4, as above described. In addition to driving the rack 4, the pinion 6 through the train of gearing comprising the gear-wheels 19, 20 and the pinion 7 drives the other rack 5. Thus, the vapor acting by its own pressure upon its liquid in the vessel 9 forces the oil from the oil-reservoir 11, driving the piston 11ᵃ and its toothed piston-rod 12 upwardly and thereby rotating the loose pinion 14 and through it the collar 16, shaft 15 and the train of gearing above described; and this train of gearing forces the racks 4, 5 upwardly, carrying with them the slotted bar 3 and the three pointers mounted therein.

Extending transversely across the register is a guide-bar 21 upon which are slidably mounted two vertical slotted bars 22, 23 within the slots in which are slidably mounted the pointers $b$, $c$ respectively. These slotted bars 22, 23 serve to displace horizontally the pointers $b$ and $c$, respectively. The slotted bar 22 is slidably supported at its upper end upon the hanger 24 and to one of its sides is attached a cord 25 which passes over a pulley 26 and by which is suspended a weight 27. Against the same side of the slotted bar 22 presses the headed end of a piston-rod 28 attached to a piston 29ᵃ which reciprocates in a cylinder 29 connected by an air-pipe 30 with an air-reservoir 31 which is so placed as to be subjected to the changes or fluctuations in temperature of the vapor and, in fact, to act as an air-thermometer, as will be more particularly explained hereinafter. When the air in the reservoir 31 expands due to an increase in the temperature of the vapor, the piston-rod or plunger 28 is forced outwardly and pushes the slidable slotted bar 22 to the left in Fig. 2, thereby carrying the pointer $b$ to the left under the curves on the glass plate or dial 2: and when, on the other hand, the air contracts in volume due to a decrease in temperature of the vapor, the slotted bar 22 is drawn to the right by the weight 27.

The fluid, be it gas or vapor, is led from the sampling nipple (not shown) through the pipe 33 and divides, part going through the pipe 34 past the valve 35 into the separator 36, where it throws down its entrained liquid and passes out at the top through the holes 37, and thence through the orifice 38 out into the open air, or into a condenser. The orifice 38 is of a standard size, say, one sixteenth of an inch in diameter, and the pressure of the vapor being known, the rate of flow from the separator through the orifice 38 may be readily computed by means of R. D. Napier's well known formula, hereinafter referred to. The liquid thrown down in the separator falls in drops from the nozzle 39 past the reservoir 31 which contains air or some other suitable expandible fluid and communicates with the cylinder 29 through the pipe 30 hereinbefore referred to. The drops of the liquid strike in succession the end 40 of the spring-controlled lever fulcrumed at 41; and the other end of this lever carrying a contact 42 is thereby made to complete the circuit through the contact 43 and the binding-post 44. From the end 40 of the lever the water spatters into a reservoir 46 provided with a drain cock 47. Part of the fluid or vapor flows from the pipe 33 past a suitable pressure-regulating valve 49 into the steam-chest 50, where it is maintained at a constant pressure by said valve 49; thence it flows through a pipe 51 past an electrically-operated valve 52, when said valve is opened, through a T 53 into a reservoir 54, which is of sufficient capacity to act as does an air-chamber in a pump. Below the reservoir 54 is a hand-controlled valve 55 which, when open, permits the vapor to flow out of the reservoir 54 through the nozzle 56 against the plate or disk 57 on the top of a rack 58 the lower end of which enters a dash-pot 59 (a spring-pot may be used, of course), and the teeth of which engage a pinion 60 fast on a shaft 61 upon which is mounted fast the pulley 62. Around the pulley 62 is wound a cord 63 which is tied to the foot of the slotted bar 23 which slides on the guide-bar 21, and which gives to the pointer $c$ displacement in a horizontal direction. A second cord 64 leads from the other side of the slotted bar 23 and is wound around the spring-drum 65. The valve-stem 52ˣ of the valve 52 is the armature of the electromagnet 66 and is controlled by a spring 67, the magnet 66 serving to open the valve 52 and the spring 67 to close it. Current flows from the battery 68 through the rheostat 69, the ammeter 70, switch 71, binding-post 44, contact 43, contact 42 when a drop of the liquid separated by the force of its fall brings the two contacts 43, 42 together against the tension of the spring 72, the lever-fulcrum 41, binding-post 45 and magnet 66 back to the battery. The magnet 66 being thus energized, the valve-stem armature 52ˣ is attracted to the magnet, thereby opening the valve 52 against the tension of the spring 67. The circuit is broken, deenergizing the magnet 66, by the spring 72 throwing the contacts 42, 43, apart. The voltage of the battery 68 is maintained constant and the time of opening (that is, the time during which the valve is held open) is the same and is a definite period for each drop of liquid which falls upon the lever: and the pressure in the reservoir 50 being maintained constant by the pressure-regulating valve 49, a definite amount of vapor escapes for each drop of the entrained liquid separated. The law of the flow of vapors known as Napier's law as expressed by the equation, $$W = \frac{pa}{70},$$

holds true, if the pressure in the reservoir 54 does not exceed six tenths of the pressure in the steam-chest 50. In this formula of Napier, W is the pounds of vapor which flow in one second through an orifice of the diameter $a$ of the conduit 51 under a pressure $p$ in the steam-chest 50. If it (the pressure in the reservoir 54) does exceed six tenths of the pressure $p$ in the chest 50, calibration, which must be resorted to in any case, will prove satisfactory. The vapor discharged from the reservoir 54 past the valve 55 through the nozzle 56 impinges as a jet against the disk 57, forcing the rack 58 down and winding up the cord 63 on the pulley 62. This draws the slotted bar 23 to the right in Fig. 2 and displaces the pointer $c$ horizontally to a reading upon the proper quality curve on the glass plate 2.

It is obvious that the greater the amount of entrained liquid in the vapor, the greater will be the number of drops and the greater the number of openings of the valve 52; and from this it follows that the wetter the vapor (the lower its dryness fraction), the greater will be the displacement to the right of the pointer $c$. This instrument gives continuous and instantaneous readings, the flow of vapor from the reservoir 54 being in the form of jets which impinge against the disk 57 in rapid succession.

In the apparatus shown in Fig. 5, the electrically-operated valve 52 is dispensed with, and the pipe $d$ is connected directly to the steam main, in case the vapor is steam. The parts shown on the right and center of Fig. 4 are also dispensed with, as will be readily understood from the fact that the pipe $d$ is connected as just described. The vapor flows through the pipe $d$ direct from the main, through the T 53 into the reservoir $e$ which is made large enough to receive the air-reservoir 31, which is connected as before by the pipe 30 with the cylinder 29. From the reservoir $e$ the vapor flows through the small orifice in the nozzle 56 and impinges against the disk 57. For vapors having different dryness fractions, the displacements of the disk 57 will vary, and, hence, the horizontal displacements of the bar 23 and the pointer $c$ will vary with the dryness fraction.

In the apparatus shown in Fig. 6 the main is connected just above the valve 55, and after flowing past the valve 55, the vapor impinges as a jet issuing from the nozzle 56 against the disk 57, thereby causing a certain displacement of the bar 23 and its pointer $c$. The point attained by the pointer $c$ is marked. Then vapor of a different quality or dryness fraction is allowed to flow at the same pressure from the nozzle 56, and the point attained by the pointer $c$ is again marked. This process is repeated for vapor at the given pressure but varying in quality, until a series of points is marked on the glass dial 2. A curve is now drawn through the points so determined. The vapor varies in quality from dry to quite wet. Another pressure is assumed, varying by, say, five or ten pounds from the first pressure taken. Vapor of this pressure is allowed to flow through the nozzle 56, and another series of points is obtained, through which a curve is drawn. Thus, a series of dryness fraction curves is obtained corresponding to various pressures and degrees of dryness of the vapor.

Fig. 7 shows the register of the apparatus illustrated in Fig. 6. Here the cylinder 29 of the air-thermometer is dispensed with, as are also the pointers $a$ and $b$. A thermometer $t$ reading vertically is connected by the pipe $h$ with the steam main so that it gives the exact temperature of the vapor.

It will be understood that by a method similar to that above explained the other forms of apparatus above described may be calibrated and accurate dryness fraction curves obtained for the dial 2.

It will be obvious to all skilled in this art that many changes may be made in the apparatus hereinbefore described for the carrying out of my invention. For example, an expansible fluid other than air may be used in the reservoir 31 to drive the bar 22. For pistons and cylinders, both air and steam, aneroid boxes may be substituted as fully explained in my co-pending application Serial No. 238,264, filed December 24, 1904. The electric circuit which operates the valve 52 need not be a normally open one but may be a normally closed one operated on break instead of at make. And instead of the spring-controlled lever actuated by the weight and the force of the impact of the drop of entrained liquid separated, a flat spring may be used. A relay may be used in the electric circuit, if deemed desirable. A diagrammatic representation of such a relay is shown in Fig. 8 in which $r$ is the relay, 44 and 45 the binding posts, 68 the main battery and $66^x$ the binding posts of the magnet 66 operating the valve 52. Again, in Fig. 9 there is illustrated a normally closed circuit in which the lever $l$ is by the spring $s$ held in contact with the thumb-screw $m$, which is insulated from the casing $n$. The impact of a drop of the separated liquid breaks the circuit, as will be readily understood. For the lever and its contact 42 of Fig. 4 the flat spring $j$ of Fig. 10 may be substituted. It is provided with a plunger $p$ the lower end of which is immersed in mercury in the cup $q$. When the flat spring $j$ contacts with the thumb-screw $m$, the circuit is normally a closed one; but when it is desired to operate on a normally open circuit, the thumb-screws $m$, $m'$ are moved upward, thereby breaking the circuit through the thumb-screw $m$ and bringing the inner or pointed end of the thumb-screw $m'$ so close to the spring $j$ as to insure the making of the circuit when a drop falls upon the free end of the spring $j$.

I claim:

1. A method for determining vapor characteristics comprising the separation of the entrained liquid from part of the vapor; discharging the rest of the vapor in the form of a jet; and measuring the momentum of the jet the discharge being controlled by the liquid separated.

2. A method for determining vapor characteristics comprising the separation of the entrained liquid from part of the vapor; reducing the rest of the vapor to a constant pressure and discharging it in the form of a jet, said discharge being controlled by the liquid separated; and measuring the momentum of the jet.

3. A method for determining vapor characteristics comprising the separation of the entrained liquid from its vapor and causing the vapor to impinge upon a suitable measuring device, such impinging of the vapor being controlled by the entrained liquid separated.

In testimony whereof I hereunto set my hand this 1st day of Oct., 1906, at said Urbana in the presence of two witnesses.

THOMAS M. GARDNER.

Witnesses:
A. J. MILLER,
WM. J. LOWE.

---

Copies of this patent may be obtained for five cents each, by addressing the "Commissioner of Patents, Washington, D. C."